(12) United States Patent
Biskop

(10) Patent No.: US 11,554,530 B2
(45) Date of Patent: Jan. 17, 2023

(54) PRINTED THREE-DIMENSIONAL OPTICAL COMPONENT WITH EMBEDDED FUNCTIONAL FOIL AND CORRESPONDING MANUFACTURING METHOD

(71) Applicant: LUXEXCEL HOLDING B.V., Eindhoven (NL)

(72) Inventor: Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 715 days.

(21) Appl. No.: 15/933,866

(22) Filed: Mar. 23, 2018

(65) Prior Publication Data
US 2018/0272597 A1 Sep. 27, 2018

(30) Foreign Application Priority Data

Mar. 24, 2017 (EP) .................................. 17162708

(51) Int. Cl.
| | |
|---|---|
| *B29C 64/112* | (2017.01) |
| *B29C 64/223* | (2017.01) |
| *G02B 1/04* | (2006.01) |
| *G02C 7/02* | (2006.01) |

(Continued)

(52) U.S. Cl.
CPC ........ *B29C 64/112* (2017.08); *B29C 35/0805* (2013.01); *B29C 64/223* (2017.08); *B29C 64/386* (2017.08); *B29C 64/40* (2017.08); *B29D 11/00009* (2013.01); *B29D 11/0073* (2013.01); *B29D 11/00442* (2013.01); *B29D 11/00807* (2013.01); *B33Y 10/00* (2014.12); *B33Y 30/00* (2014.12); *B33Y 50/02* (2014.12); *B33Y 80/00* (2014.12); *C09D 11/101* (2013.01); *G02B 1/041* (2013.01); *G02B 26/02* (2013.01); *G02C 7/02* (2013.01); *G02C 7/022* (2013.01); *G02C 7/083* (2013.01); *G02C 7/10* (2013.01); *G02C 7/102* (2013.01); *B29C 2035/0827* (2013.01);

(Continued)

(58) Field of Classification Search
CPC .............................. G02B 1/041; B29C 64/112
See application file for complete search history.

(56) References Cited

U.S. PATENT DOCUMENTS 4,300,818 A * 11/1981 Schachar ............... A61B 3/103
349/13
2012/0019936 A1 1/2012 Blessing et al.
(Continued)

FOREIGN PATENT DOCUMENTS

| DE | 102009004377 A1 | 7/2010 |
|---|---|---|
| EP | 3273290 A1 | 1/2018 |

(Continued)

OTHER PUBLICATIONS

Extended European Search Report for European Application No. 18163712.6: dated Jul. 9, 2018.

*Primary Examiner* — Alison L Hindenlang
*Assistant Examiner* — Asha A Thomas
(74) *Attorney, Agent, or Firm* — The Dobrusin Law Firm, P.C.

(57) ABSTRACT

The present invention refers to a printed three-dimensional optical component built up from layers of printing ink characterized in that the three-dimensional optical component comprises at least one foil between two consecutive layers. The present invention further relates to a corresponding manufacturing method.

12 Claims, 2 Drawing Sheets

(51) Int. Cl.
*B29D 11/00* (2006.01)
*B33Y 10/00* (2015.01)
*B33Y 30/00* (2015.01)
*B33Y 80/00* (2015.01)
*B33Y 50/02* (2015.01)
*B29C 35/08* (2006.01)
*B29C 64/386* (2017.01)
*B29C 64/40* (2017.01)
*C09D 11/101* (2014.01)
*G02C 7/08* (2006.01)
*G02C 7/10* (2006.01)
*G02B 26/02* (2006.01)
*B29K 105/00* (2006.01)
*G02B 5/30* (2006.01)

(52) U.S. Cl.
CPC .............. *B29K 2105/0002* (2013.01); *B29K 2105/0058* (2013.01); *G02B 5/3033* (2013.01); *G02C 2202/16* (2013.01)

(56) References Cited

U.S. PATENT DOCUMENTS

| | | |
|---|---|---|
| 2015/0093544 A1 | 4/2015 | Van De Vrie et al. |
| 2015/0273757 A1* | 10/2015 | Pforte .................... B32B 9/045 |
| | | 428/172 |
| 2016/0003977 A1 | 1/2016 | Van De Vrie et al. |

FOREIGN PATENT DOCUMENTS

| WO | 2010/091888 A1 | 8/2010 |
|---|---|---|
| WO | 2013/167528 A1 | 11/2013 |
| WO | 2014/108364 A1 | 7/2014 |
| WO | 2015/186010 A1 | 12/2015 |
| WO | 2016/075563 A1 | 5/2016 |
| WO | 2016/115369 A1 | 7/2016 |
| WO | 2016/146374 A1 | 9/2016 |

* cited by examiner (Figure 1)

PRINTED THREE-DIMENSIONAL OPTICAL COMPONENT WITH EMBEDDED FUNCTIONAL FOIL AND CORRESPONDING MANUFACTURING METHOD

BACKGROUND

The present invention relates to a printed three-dimensional optical component built up from layers of printing ink and a method for manufacturing such like optical component.

Printed optical components are known from the prior art, see for example WO 2010/091888 A1 and WO 2014/108364 A1. Producing three-dimensional optical components, in particular spectacle lenses, through an additive manufacturing scheme such as three-dimensional inkjet printing has several advantages. Currently, spectacle lenses are produced in a multi-step process from pre-manufactured lens blanks which are retrieved according to prescription and post-processed to yield the customized spectacle lenses that are fit into the spectacle frame by the optician. From lens blank to final spectacle lens, many handling steps and more than ten machine processing steps are necessary. Around 80% of the materials used are wasted in the cutting process, Even if some of this material can be re-used, providing spectacle lenses through the conventional subtractive manufacturing process is far from being sustainable. Three-dimensional inkjet printing allows manufacturing of spectacle lenses in a fast, one-step and sustainable way.

Correcting vision is, however, not the only requirement put on modern spectacle lenses. There is a desire for enhanced functionality of optical components, ranging from simple sun-blocking, polarization or colourization functions to augmented reality applications. Desirably, functionality of the optical components is responsive to ambient light conditions, user or sensor input as is the case in photochromic lenses, for example.

Implementing such functionality for printed optical components has been difficult to achieve so far, Colourization, for example, is achieved through a colour filter. In the case of printed optical components, the colour filter is provided by a layer of coloured printing ink. This, however, requires the use of low-viscosity printing inks, resulting in compromised colour density and evenness, leading to functional optical components of reduced quality.

SUMMARY

It is therefore the purpose of the present invention to provide a printed three-dimensional optical component with enhanced functionality of a quality and capability equal or superior to conventional, functionally enhanced optical components as well as a corresponding manufacturing method.

This object is accomplished according to the present invention by a printed three-dimensional optical component built up from layers of printing ink characterized in that the three-dimensional optical component comprises at least one foil between two consecutive layers.

Herewith a printed three-dimensional optical component is provided that has an advanced functionality, wherein the quality of the implemented functionality is only limited by the quality of the implemented foil. Hence, the present invention combines the advantages of printed optical components with the advantages of functionality enhancement of conventional optical components.

In the sense of the present invention, printing a three-dimensional structure is carried out by depositing droplets of printing ink side by side and one above the other in several consecutive depositing steps by means of a print head, wherein in each depositing step a plurality of droplets is ejected simultaneously by a plurality of ejection nozzles of the print head. The three-dimensional structure is thus build up layer by layer. This layered structure is characteristic of printed optical components. As known from the prior art, the deposited droplets are at least partly cured after each depositing step in a curing step. The printing ink of the deposited droplets is either fully cured after each depositing step or only partly cured. It is a known technique from the prior art, see WO2013/167528 A1, to let a time interval elapse between the deposition of the droplets and their curing. This allows the droplets to flow under the influence of gravitation in a direction tangent to the surface of the layer just printed, resulting in a particularly smooth surface, Whereas for general three-dimensional structures the smoothness of the layer surfaces is only important for the layers forming the surface of the final structure, a smooth layer structure is equally important for optically transparent structures, e.g. lenses. Preferably, the printing ink comprises an UV curable liquid monomer becoming a polymer if being cured. The printing ink preferably comprises transparent or translucent printing ink. In this way, customized three-dimensional components can be provided in a fast, cost-saving and sustainable manner.

The three-dimensional optical component in the sense of the present invention preferably comprises lenses, in particular spectacle lenses.

The at least one foil can cover the entire area of the lens. The foil material preferably provides adequate adhesion to the printing ink deposited above and below the at least one foil. Here and in the following, "above" and "below" as well as "top and "bottom" are defined by the printing direction, i.e. droplets of printing ink move from top to bottom during the printing process. Alternatively, the permeability of the at least one foil is chosen such that a mechanical bond between the upper and lower part of the printed optical component can form. Preferably, bonding and/or adhesion are strong enough to avoid delamination during the edging of the optical component, e.g. during fitting into a frame, as well as delamination over time due to temperature shocks or moisture loads. Alternatively, the foil can be confined to a subarea of the lens.

In a preferred embodiment of the present invention the at least one foil is a coloured foil. In this way, a pre-coloured three-dimensional optical component of high quality is provided. In particular, the density and evenness of colour of current state of the art foils is conferred to printed optical components. Preferably, the foil provides a colour filter of a defined transmission. The transmission is preferably between 8% and 80%, where a transmission between 8% and 18% advantageously provides an optical component for application, e.g. wear, in bright sunlight, a transmission between 18% and 34% in medium sunlight, between 34% and 80% in low sunlight. In particular, the three-dimensional optical component is a coloured sunglass lens with or without vision correction.

In a preferred embodiment of the present invention the at least one foil is a polarising foil.

Hence, a three-dimensional optical component with polarization properties is advantageously provided. Preferably, the polarizing foil reduces the transmission of the three-dimensional optical component, in particular by at least one half. In a preferred embodiment, the polarizing foil is oriented inside the lens such that glares are reduced, e.g. through blocking horizontally reflected sunlight. This advantageously provides a three-dimensional optical component for application in and on the water, such as fishing, sailing and other water sports.

In a preferred embodiment of the present invention the at least one foil is a photochromic foil. In particular, the photochromic foil changes transmission and/or colour upon exposure to ultraviolet light and/or upon temperature change. In this way, a three-dimensional optical component is provided that adapts to ambient light and/or temperature conditions. Preferably, the photochromic foil is transparent, i.e. has maximal transmission, at low intensity of the ambient light and reduces its transmission upon intensity increase of the ambient light.

Coloured, polarizing and photochromic foils constitute passive foils that provide passive functionality to the three-dimensional optical component.

In a preferred embodiment of the present invention the three-dimensional optical component comprises an input unit that is coupled to the at least one foil, Hence, a three-dimensional optical component with an active functional element is provided. Through the input unit at least one property, in particular an optical property, of the foil can be changed. Thus, the functionality of the optical component can actively be triggered and/or changed through the input unit. According to the present invention, the input unit is suitable to receive input from a user or a sensor and convert this input into a suitable control signal for the at least one foil.

In a preferred embodiment of the present invention the input unit comprises a sensor. In particular, the sensor is a light sensor, a location sensor, an accelerometer, a pressure sensor and/or an inclinometer, providing an optical component that adapts its functionality according to light intensity, wave length, location, acceleration, user input and/or tilt, for example.

In a preferred embodiment of the present invention the three-dimensional optical component comprises a stack of foils constituting a display. In this way, a display is advantageously integrated into the optical component which preferably changes from transparency to visibility and vice versa upon input from the input unit. Preferably, the stack of foils provides a stack of films building e.g. an organic light-emitting diode display, preferably an attractive-matrix organic light-emitting diode display. In this way, a three-dimensional optical component with augmented reality capabilities is provided.

In a preferred embodiment of the present invention the foil comprises an active liquid crystal element. An active liquid crystal or active fluid as they are called as well, is a soft material whose constituents can self-propel.

In a preferred embodiment of the present invention the active liquid crystal element changes its refractive index, Preferably, the active liquid crystal element changes its refractive index upon input from the input unit. Hence, an optical component with adaptable optical properties is provided. In particular, the thus enhanced optical component provides a bi-focal design with a second focal power that can be activated through input from the input unit during use, e.g, while reading.

In a preferred embodiment of the present invention the active liquid crystal element changes its transparency and/or colour upon application of electric voltage. In this way, transmission of the optical component can be changed instantly and actively, e.g, through input from the user through the input unit. Preferably, the active liquid crystal element reduces its transmission through a change in transparency and/or colour to provide instant privacy. In particular, this reduction is triggered by a detected camera flash or via computer vision detection.

In a preferred embodiment of the present invention the three-dimensional optical component comprises a power supply unit. Preferably, the power supply und supplies the input unit and/or the foil with electric power. The power supply unit preferably comprises at least one solar cell.

In a preferred embodiment of the present invention the three-dimensional optical component comprises a frame in which the input unit and/or the power supply unit are contained and the three-dimensional optical component comprises electrical connectors that connect the at least one foil and the input unit and/or power supply unit contained in the frame. Hence, power supply and input unit are advantageously hidden in the frame, Preferably, the electrical connectors conduct electrical power and/or data signals between the power supply and/or input unit and the at least one foil. Preferably, the electrical connectors are located at the edge of the frame such that they contact the at least one foil embedded in the optical component. Alternatively and additionally, the electrical connectors are located inside the optical component.

In a preferred embodiment of the present invention the electrical connectors comprise electrical circuits printed inside the optical component. In particular, three-dimensional printed conductive tracks are thus provided.

In a preferred embodiment of the present invention the electrical connectors comprise transparent conductive tracks printed from transparent conductive polymers, Preferably, the conductive polymers have the same or nearly the same refractive index as the surrounding optical component. Hence, electrical connectors are provided inside the optical component that escape detection by the eye. Alternatively, electrical connectors comprise classical conductors such as e.g. copper wires or conductors printed from conventional, non-transparent conductive printing inks.

Another object of the present invention is a method for manufacturing a three-dimensional optical component according to one of the preceding claims, wherein three-dimensional optical component is built up layer by layer through deposition of droplets of printing ink at least partially side by side and one above the other, characterized in that at least one foil is deposited between two consecutive layers during a deposition step.

Herewith, a method is provided that allows the production of three-dimensional optical components in the easily customizable, time-saving and sustainable manner characteristic of additive manufacturing and at the same time allows to add enhanced functionality of uncompromised quality and rich variety to these optical components. Printing of the three-dimensional optical component is carried out as described above. In particular, the method according to the present inventions comprises a number of printing steps during which an intermediate optical components is being built up layer by layer. During at least one printing step before the final printing step, i.e. on the unfinished optical component, a deposition step is carried out. Printing is paused during the deposition step and at least one foil is deposited on the intermediate optical component built up by the preceding printing steps. After the deposition step, printing is being continued and at least one layer of printing ink deposited on the at least one foil. Preferably, the deposition step is carried out after a printing step when the top surface of the intermediate optical component is a flat plane. That means, the printing process is preferably paused when the optical component being printed provides a flat top plane. During the deposition step, the at least one foil is deposited on the top surface of the intermediate optical component, preferably on a flat top surface. Deposition on a flat surface has the advantage that bending and stressing of the embedded foil is being avoided, preventing the formation of unwanted optical effects such as poor adhesion of the foil to the intermediate optical components or the formation of ripples on the foil. Alternatively, the at least one foil is deposited on a curved top surface of the intermediate optical component. Preferably, volume and shape of the at least one deposited foil is taken into account in the printing file.

In a preferred embodiment, the layer deposited before the deposition step is not cured, so that wet build material advantageously provides adhesion to the at least one foil to be deposited in the following deposition step. Furthermore, this has the advantage of avoiding air inclusions. Air inclusions have to be avoided as air included in these bubbles will contract and expand at a different rate as compared to the printing ink, thus compromising the optical quality of the component.

Alternatively or additionally, the deposition step is followed by a compensation step during which tolerances are filled by deposition of additional droplets of printing ink. After the compensation step, printing is continued, Volume and location of the droplets deposited during the compensation are preferably determined by a feedforward system based on experience with producing an optical component of a certain shape.

In a preferred embodiment, a vacuum is applied to the intermediate optical component after the deposition step, drawing out unwanted air inclusions.

DETAILED DESCRIPTION

Figure 1:
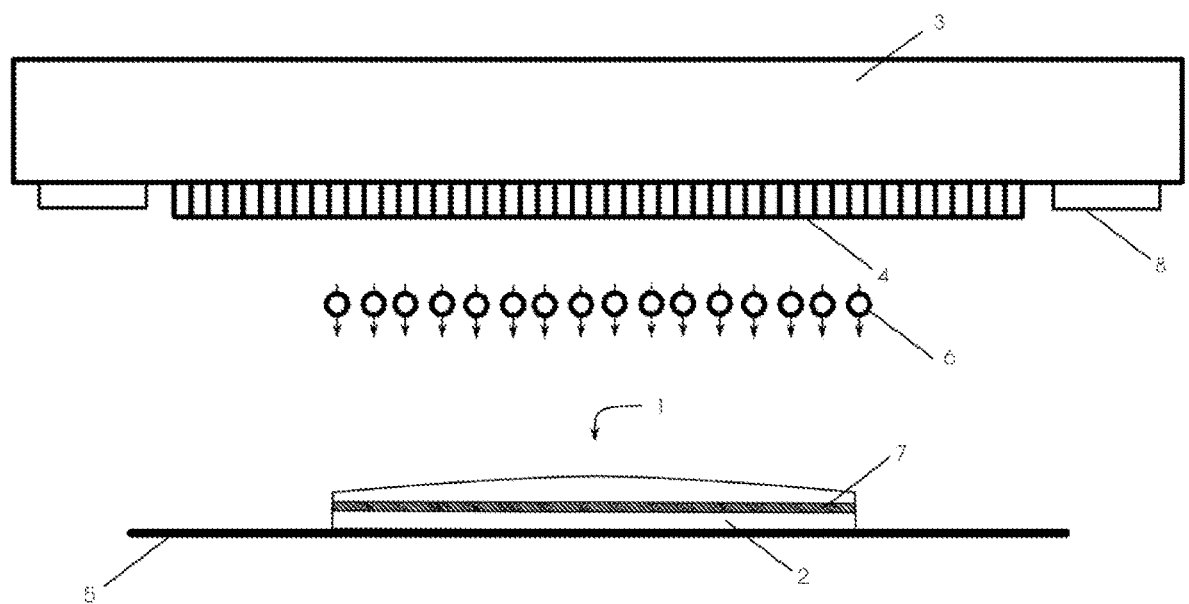
FIG. 1 schematically illustrates a three-dimensional optical component according to an exemplary embodiment of the present invention as well as a method for manufacturing such like optical component according to a preferred embodiment of the present invention.

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale. Where an indefinite or definite article is used when referring to a singular noun, e.g. "a" "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 a three-dimensional optical component 1 according to an exemplary embodiment of the present invention as well as a method for manufacturing such like optical component 1 according to a preferred embodiment of the present invention are illustrated schematically. Printing is carried out using a printing system comprising a print head 3 equipped with a plurality of ejection nozzles 4. The ejection nozzles are arranged in parallel on the lower side of the print head 3. Each ejection nozzle 4 is in fluid connection with at least one reservoir of printing ink (not shown) and preferably comprises piezoelectric crystals to eject droplets of printing ink from the print head 3 towards the substrate 5. The printing system can therefore also be referred to as droplets-on-demand inkjet printer. In the first printing step, a volley of several droplets are ejected in parallel and simultaneously towards the substrate 5, so that a layer of deposited droplets arranged side by side is generated on the substrate 5. With each following printing step, layers of deposited droplets are provided on top of each other.

After deposition of the droplets, adjacent deposited droplets merge at least partially which each other (the deposited droplets are therefore not illustrated) and are subsequently cured in a curing step by ultraviolet (UV) light emitted by LED's (light emitting diodes) 8 of the print head 3. The printing ink comprises a transparent or trans-lucent printing ink, preferably an UV curable liquid monomer becoming a polymer if being cured.

The print head 3 and in particular the individual ejection nozzles 4 are controlled via printing data provided in the form of an image file, e.g. a computer-aided design (CAD) file. The optical component 1 being printed is preferably a lens, in particular a spectacle lens.

The printing steps and the curing steps are repeated subsequently until a desired intermediate optical component 2 being built up. Preferably, the intermediate optical component 2 provides a flat top surface. On top of the intermediate optical component 2, at least one foil 7 is deposited during a deposition step. The foil 7 enhances the functionality of the optical component being built. In this way, it is advantageously possible to combine the advantages of additive manufacturing with the flexibility and quality of functional foils 7. Providing the same functionality through printing directly is difficult as the used printing materials have to fulfil the requirements to be useful printing inks, but on the other hand have to be materials from which the required functionalization can be derived. Separating this, the foil 7 can be manufactured from materials and in processes that optimize the quality of its function and the optical component can be manufactured from materials and in a process that optimizes the quality of the optical component.

In a preferred embodiment of the present invention, the at least one foil 7 is a coloured and/or a polarizing and/or a photochromic foil 7. A coloured and/or polarizing foil 7 reduces the transmission of light, in particular ultraviolet light, of the optical component. For example, a coloured spectacle lens can thus be manufactured for practical as well as fashion purposes. A photochromic foil 7 changes its colour and/or transmission upon exposure to UV light. For example, the photochromic foil 7 reduces its transmission through darkening in bright ambient, e.g. sunlight, conditions.

Bringing about the colorization of an embedded foil 7 in contrast to direct printing serves as a good example to demonstrate the advantages of the present scheme over existing schemes based on printing alone. When printing coloured layers inside an optical component, the corresponding printing material has to contain a dye, resulting in a low viscosity printing ink compromising the colour density and colour evenness of the printed layer. This drawback is overcome by the present method as for the production of the foil 7 all state of the art technology can be used to achieve the correct colour density and evenness of colour.

In the preferred embodiment, where the foil 7 is a polarizing foil 7, the orientation of the foil 7 is preferably chosen such that the desired components of the ambient light are blocked. For example, glare reduction can be achieved by blocking horizontally reflected sunrays, e.g. sunrays reflected from a water surface. Through a suitable orientation of the polarizing foil 7, special sunglasses for use in water sports etc. can be provided, for example. The orientation of the foil 7 has to be taken into account in the finishing process of the optical component 1, in particular during edging.

Preferably, the transmission of the coloured and/or polarizing and/or photochromic foil 7 is chosen between 8% and 80%, where a transmission between 8% and 18% is suitable for use in bright ambient light conditions, a transmission between 18% and 34% is suitable for use in intermediate ambient light conditions and a transmission between 34% and 80% is suitable for use in low ambient light conditions, Respecting these transmission intervals, sunglasses for use in different sunlight conditions are advantageously provided, Coloured, polarizing and/or photochromic foils 7 may be used to incorporate fashion and design as well, Preferably, the last layer printed before the deposition step is not cured. The wet printing ink provides improved adhesion and bonding properties for the added foil 7. In this way, also air inclusions can be reduced.

The foil 7 may be permeable to allow for the formation of bonds between the intermediate optical component built before the deposition step and the layers deposited after the deposition step.

Preferably, a vacuum is applied to the foil 7 after the deposition step to suck out air from air inclusion. These air inclusions would otherwise compromise the optical quality of the resulting optical component 1, Alternatively or additionally, the deposition step is followed by a compensation step during which tolerances on the embedded foil 7 are filled to yield an even surface.

After the deposition step, the printing process is continued until the final three-dimensional optical component is achieved. Preferably, the data file controlling the printing process takes into account volume, location and orientation of the embedded foil 7.

Figure 2:
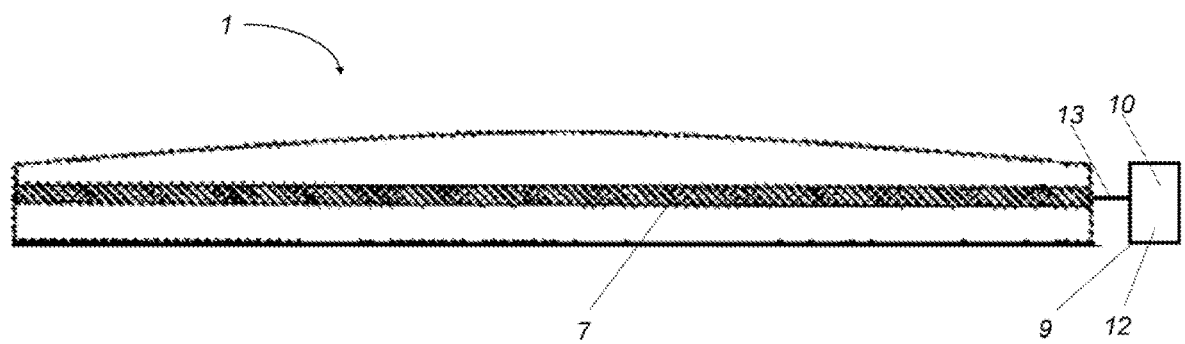
FIG. 2 illustrates a cross-sectional view of an exemplary three-dimensional optical component according to the present teachings, including a frame with an input unit and/or a power supply unit.

In a preferred embodiment, as illustrated in FIG. 2, a frame 9 is added to the optical component. This frame is either printed or provided by conventional production means. Printing of the frame can be carried out in parallel, after or before printing of the optical component.

Figure 3:
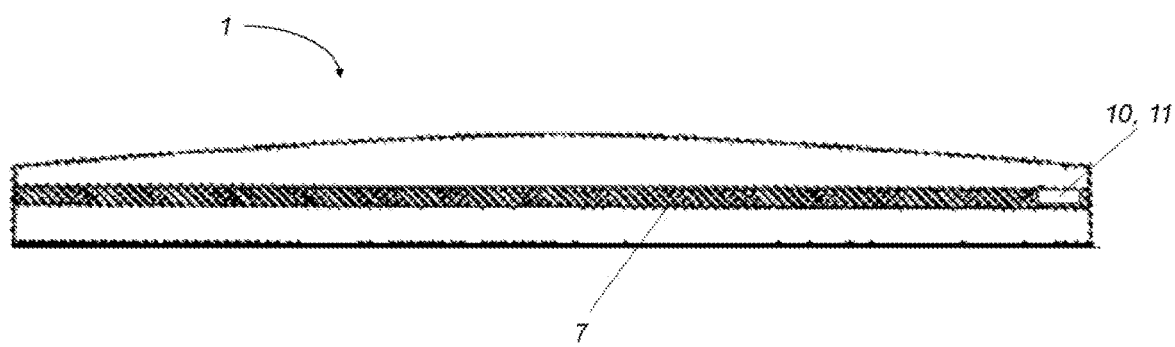
FIG. 3 illustrates a cross-sectional view of an exemplary three-dimensional optical component according to the present teachings, including an input unit.

In a preferred embodiment, the foil 7 itself comprises an input unit 10, as illustrated in FIG. 3. Alternatively, the frame comprises an input unit 10, as illustrated in FIG. 2. The input unit is coupled to the foil 7. The input unit comprises a sensor and/or button, responsive to user input. A sensor 11 is illustrated in FIG. 2. Alternatively, the input unit comprises a light sensor, a location sensor, an accelerometer, a pressure sensor and/or an inclinometer, providing an optical component that adapts its functionality according to light intensity, wave length, location, acceleration, user input and/or tilt, for example.

In a preferred embodiment, the optical component 1 comprises a power supply unit 12, e.g, in form of a solar cell. This unit is used to supply the input unit and, if applicable, the foil 7 with power.

The foil 7 is connected with the input unit 10 and/or the power supply unit 12 through electrical connectors 13. These electrical connectors may be printed or provided by conventional embedding techniques. In a preferred embodiment, the electrical connectors comprise conductive tracks printed from conductive printing ink. Preferably, the conductive printing ink is a transparent conductive polymer. In this way, electrical connections between foil 7 and power supply unit and input unit, respectively, can be provided without impairing the optical quality of the corresponding component 1. Alternatively, the electrical connectors can be embedded conventional copper wires or conductive tracks printed from a conventional, non-transparent conductive printing ink. Especially in the case of non-transparent electrical connectors it is preferred, to hide the connectors at the edge of the optical component 1 and/or the frame, such that they are in contact with the foil 7.

Figure 4:
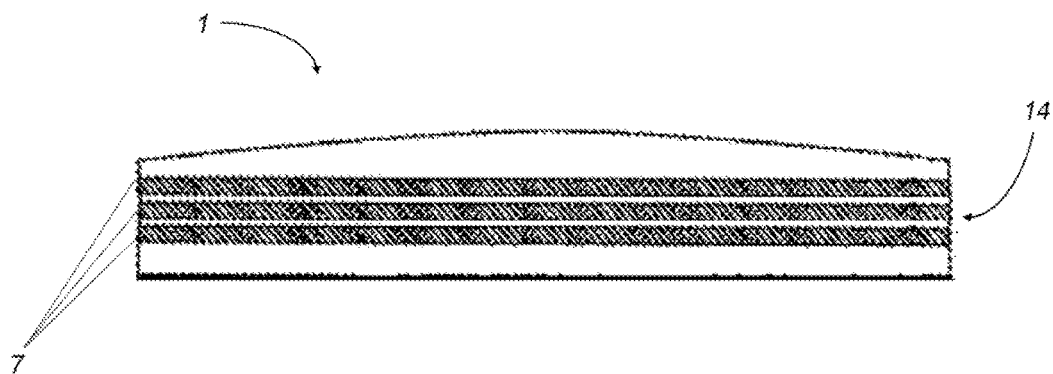
FIG. 4 illustrates a cross-sectional view of an exemplary three-dimensional optical component according to the present teachings, including a stack of foils providing an active display.

In a preferred embodiment, a stack of foils 7, as illustrated in FIG. 4, is deposited during the deposition step on the intermediate optical component 2. Preferably, the stack of foils 7 provides an active display 14 embedded in the optical component 1. E.g. the stack of foils forms an organic light-emitting diode (OLED), in particular an active-matrix organic light-emitting diode (AMOLED), Through addition of an active display, an optical component 1 for use in augmented reality applications is advantageously provided.

In an alternative preferred, embodiment, the foil 7 comprises an active liquid crystal or active fluid. In this way an optical component 1 is provided, whose functionality can actively be changed, preferably through input from the input unit. In particular, the refractive index of the active liquid crystal can be changed. It is herewith advantageously possible to provide an optical component 1 with at least two zones of differing optical function. In particular, a bifocal lens is thus provided, whose second focal power can be turned on during use, e.g. reading, and can be turned off if not used.

Alternatively or additionally, the transparency and/or colour of the active liquid crystal can be changed. For example, the change can be induced through input from the input unit, e.g. through application of a voltage. Thus, an optical component 1 is advantageously provided that can be actively darkened, e.g, on user input or sensor input. For example, the optical component darkens when a light sensor comprised in the input unit detects a camera flash or computer vision detection. In this way, optical components 1 granting instant privacy are provided.

KEY TO FIGURES

1 Three-dimensional optical component
2 Intermediate optical component
3 Print head
4 Printing nozzles
5 Substrate
6 Droplets of printing ink
7 Foil
8 Light source
9 Frame
10 Input unit
11 Sensor 12 Power supply unit
13 Electrical connectors
14 Display It is claimed:

1. A printed three-dimensional optical component built up from layers of printing ink wherein the three-dimensional optical component comprises a stack of foils constituting a display between two consecutive layers;
   wherein the three-dimensional optical component comprises an input unit that is coupled to at least one foil of the stack of foils;
   wherein at least one foil of the stack of foils comprises an active liquid crystal element,
   wherein the three-dimensional optical component comprises a lens;
   wherein the lens is a spectacle lens;
   wherein the three-dimensional optical component comprises a frame in which the input unit and/or a power supply unit are contained;
   wherein the frame is a spectacle frame;
   wherein the three-dimensional optical component comprises electrical connectors that connect the at least one foil and the input unit and/or the power supply unit contained in the frame.

2. The printed three-dimensional optical component according to claim 1, wherein at least one foil of the stack of foils is a colored foil.

3. The printed three-dimensional optical component according to claim 1, wherein at least one foil of the stack of foils is a polarizing foil.

4. The printed three-dimensional optical component according to claim 1, wherein at least one foil of the stack of foils is a photochromatic foil.

5. The printed three-dimensional optical component according to claim 1, wherein the input unit comprises a sensor.

6. The printed three-dimensional optical component according to claim 1, wherein the active liquid crystal element changes its refractive index upon exposure to ultraviolet light.

7. The printed three-dimensional optical component according to claim 1, wherein the active liquid crystal element changes its transparency and/or color upon application of electric voltage.

8. The printed three-dimensional optical component according to claim 1, wherein the three-dimensional optical component comprises a power supply unit.

9. The printed three-dimensional optical component according to claim 1, wherein the electrical connectors comprise electrical circuits printed inside the optical component.

10. The printed three-dimensional optical component according to claim 9, wherein the electrical connectors comprise transparent conductive tracks printed from transparent conductive polymers.

11. The printed three-dimensional optical component according to claim 1, wherein the printing ink comprises a UV curable liquid monomer becoming a polymer if being cured.

12. The printed three-dimensional optical component according to claim 1, wherein the layers of printing ink are formed by deposited droplets, and wherein the droplets are at least partially cured after depositing.

* * * * *